United States Patent Office 3,251,816
Patented May 17, 1966

3,251,816
METHOD OF PRODUCING EMULSION POLYMERS
Allan Rickard Benjamin Furendal, Bofors, and Olof Åke Magnusson and Jan Ove Urban Rosberg, Karlskoga, Sweden, assignors to Aktiebolaget Bofors, Bofors, Sweden, a corporation of Sweden
No Drawing. Filed Feb. 20, 1961, Ser. No. 113,569
Claims priority, application Sweden, Feb. 20, 1960, 1,734/60
18 Claims. (Cl. 260—86.1)

This invention relates to emulsion polymers. More particularly, it is directed to improvements in the production of emulsion polymers, especially homo- and co-polymers of acrylic acid and methacrylic acid esters.

Methods of producing plastic emulsions through so-called emulsion polymerization of unsaturated monomers such as acrylic and methacrylic acid esters have been known for a long time. The main components when producing such emulsions are as follows:

Water
Monomers
Emulsifier and
Polymerization catalyst

The properties of a plastic film obtained by drying such an emulsion are influenced to a high degree by the composition of the three last-mentioned components. The emulsifiers and the composition products of the polymerization catalysts which remain in the finished emulsion influence the water sensitivity of such a plastic film to a high degree. A consequence of this is that the plastic film whitens when it comes into contact with water. Emulsions of certain especially water-resistant polymers such as polyacrylates and polymethacrylates could therefore not be utilized previously to the extent which would otherwise have been permitted by the properties of the pure polymers. In cases when there are severe requirements for water resistance, it has therefore been necessary to resort to so-called solution polymers of the types of plastic in question, which have involved such inconveniences as making the polymer itself more expensive and it has involved higher costs and disadvantages in the application thereof. Furthermore, emulsion polymers can be produced with a considerably higher molecular weight than solution polymers, which is of great significance to the physical properties of the polymers.

It is among the principal objects of this invention to provide homo- and co-polymers, by emulsion polymerization, such as above mentioned, characterized by markedly enhanced water resistance. Another object of this invention is to provide homo- and co-polymers by emulsion polymerization, such as above mentioned, characterized by great translucency of films formed therefrom when exposed or subjected to water. Further objects and advantages will become apparent from the more detailed description of the invention hereinafter to be set forth.

In accordance with the present invention, the emulsion polymerization is effected by employing non-ionic emulsifiers to emulsify the monomers. The polymerization catalysts employed are those having cations such as ammonium or amino (quaternary ammonium) ions or ions which can be precipitated as salts which are difficult to dissolve (insoluble or sparingly soluble) and whereof the anions are those which, during the course of polymerization, are converted into sulfate and/or sulfite ions. The cations which give rise to difficultly soluble sulfates and sulfites are added to the emulsion in a quantity equivalent to that of the ions in the catalyst system.

The emulsions thus obtained in accordance with the invention are characterized by a very low electrolyte content since the ions of the catalyst system are precipitated as salts which are insoluble or sparingly soluble in water. The salts which are precipitated need not be removed from the emulsion. It has been found that the presence of these precipitates do not affect the water-resistance of the plastic films formed by drying the emulsion; nor do they affect the transparency of such films to any major extent.

Among the emulsifiers which are useful in accordance with the invention, there are: compounds whereof the hydrophilic portion consists of hydroxyl and/or ether groups, as for example: alkyl phenoxy-polyglycol ethers, whereof the alkyl phenoxy-polyglycol has the formula:

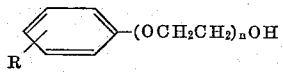

in which R is an alkyl group having 8 to 9 carbon atoms and in which n may vary between 5 and 50, polyethylene glycol esters having the formula:

$$R \cdot CO(OCH_2CH_2)_nOH$$

in which R is an alkyl group having 11–17 carbon atoms and in which n may vary between 5 and 50, alkyl polyglycol ethers having the formula:

$$R(OCH_2CH_2)_nOH$$

in which R is an alkyl group having 11–17 carbon atoms and in which n may vary between 5 and 50, and polyethylene glycol sorbitan etsers, e.g. sorbitan esters of fatty acids such as oleic, palmetic, stearic and lauric acid and having a HLB value between 9.6 and 16.7.

The catalyst system may include, e.g., ammonium persulfate, barium persulfate, sulphur dioxide, ammonium sulfite, ammonium bisulfate, methyl amine bisulfite, ammonium thiosulfate, barium thiosulfate, ammonium dithionate and barium dithionate. The use of such compounds in the catalyst system for emulsion polymerization is previously known through e.g., the U.S. Patent 2,462,354 and the British Patent 573,270.

Examples of cations which produce precipitations of the sulfate and sulfite ions that are difficult to dissolve are set forth in the following Table I, wherein are tabulated the difficultly soluble salts and also the suitable bases (hydroxyl compounds) which effect such precipitation.

TABLE I

| | Solubility in 100 ml. water |
|---|---|
| $BaSO_4$ | 0.000222 g. at 18° C. |
| $BaSO_3$ | 0.02 g. at 20° C. |
| $SrSO_4$ | 0.0114 g. at 30° C. |
| $SrSO_3$ | 0.0033 g. at 17° C. |
| $CaSO_4 \cdot 2 H_2O$ | 0.241 g. at 0° C. |
| $CaSO_3 \cdot 2 H_2O$ | 0.0043 g. at 18° C. |
| $Ba(OH)_2 \cdot 8 H_2O$ | 5.6 g. at 15°, 94.7 at 78°. |
| $Sr(OH)_2$ | 0.41 g. at 0°, 21.8 g. at 100°. |
| $Ca(OH)_2$ | 0.185 g. at 0°, 0.077 g. at 100°. |

From the table it will be noted that barium hydroxide is most appropriate for the precipitation of the sulfate ions, due to the low solubility of $BaSO_4$ and because of the comparatively high solubility of $Ba(OH)_2 \cdot 8H_2O$, which means that the hydroxide can be added to the emulsion in the form of a water solution having a known hydroxide content. Usually the content of sulfite ions is only a fraction of the content of sulfate ions in an emulsion and therefore, in practice, also the sulfite ions can be precipitated with barium, although $BaSO_3$ has a comparatively high solubility.

According to the foregoing, the hydroxides of Ba, Sr or Ca are added in a quantity equivalent to the anions in the emulsion. This is done is such a way that 100 g. of the completely polymerized emulsion is titrated conductometrically with a solution of the hydroxide having a known concentration. At the titration the electrolytic conductivity decreases to a minimum, and then rises again. When the conductivity has reached the minimum value all the sulfate and sulfite ions which can be precipitated under the prevailing conditions are precipitated. This minimum value is thus read off, and on the basis of this value, the quantity of hydroxide required for the entire batch is computed.

In the following examples films have also been included which are made from emulsions without the addition of the above-mentioned hydroxides, in order to demonstrate the effect of these additives. In these cases, the pH of the emulsions have only been adjusted with $NH_3$ to pH 9.5. This is due to the fact that emulsions of this type have a maximum stability at about this pH value.

0.2 mm. thick films were made from the emulsions by drying a calculated quantity of emulsion at 50° C. in a glass bowl having a plane bottom.

The determination of the whitening of the emulsion films when immersed in water was carried out in the following way:

A piece 30 x 30 mm. was cut out of the 0.2 mm. thick film. This piece was fastened with tape on an aluminum washer with a 20 mm. hole. The film was fastened so that it covered the hole. The aluminum washer with the film was thereafter immersed in water. The reduction of the translucency was measured at periodic intervals with a Lange colorimeter with the color filters removed.

The following are examples in accordance with the invention:

Example 1

Carbon dioxide was conducted into a 5-litre 3-necked round flask provided with a stainless stirrer and thermometer until all atmospheric oxygen had been removed. A monomer-emulsifier mixture consisting of 1900 g. butyl methacrylate, 100 g. butyl acrylate and 100 g. nonylphenoxypolyethoxyethanol (HLB value=13. HLB value Described by Griffin, W. C., in J. Soc. Cosmet. Chem., 1949, 1, 311 and 1954, 5, 1) had been weighed up in advance in a separate mixing vessel.

Thereafter, 2000 g. water, 525 g. of said monomer-emulsifier mixture, 1.2 g. ammonium persulfate (dissolved in 20 g. water) and 1.2 g. sulphur dioxide (dissolved in 20 g. water) were added, in sequence, into the flask. The temperature was thereafter raised with the aid of a water bath to 30° C. and after a few minutes the polymerization started, which could be noted by the rise in temperature. By means of cooling, the temperature was held at approx. 40° C.

The balance of monomer-emulsifier mixture was thereafter added in 12 portions of 131 g. during the course of approximately 6 minute intervals. By means of cooling the temperature was held at 38–40° C. the whole time. After the 10th addition, 0.3 g. of amomnium persulfate and 0.3 g. of sulphur dioxide, each dissolved in 10 g. water, were added. After the last addition, following a reaction pulse of 15 minutes, the emulsion was held for another 30 minutes at 40° C.; and was thereafter blown through with air for 15 minutes at 40° C. After cooling to room temperature the emulsion was strained through a metal screen, and 2 g. of polymer lumps were filtered off. The screened emulsion contained 49.3% of dry substance. The pH of the emulsion was 1.9. The yield based on the weight of the monomers was 97.8%.

100 g. of the original, i.e., the screened, emulsion having a pH of 1.9 was titrated conductometrically with a 0.3 N solution of $Ba(OH)_2$. The conductivity decreased from the initial value of 2.5 m. MHO to a minimum value of 0.25 m. MHO. 3.4 ml. $Ba(OH)_2$ solution was required to obtain this minimum value.

To 4000 g. of the screened emulsion there was thereafter added $$\frac{3 \times 4000}{100} = 120 \text{ ml. } 0.3 \text{ N } Ba(OH)_2$$

i.e., to effect the said minimum conductivity. The pH of the emulsion was thus brought to 6.5. In order to improve the stability of the emulsion, $NH_3$ was added to bring the pH up to 9.5.

A film, 0.2 mm. thick, of this emulsion was prepared and tested according to the procedure previously described. This film is designated No. 1A in the following Table II.

To a separate sample of the screened emulsion, $NH_3$ was added to produce pH 9.5. From this emulsion a 0.2 mm. thick film was made which was tested. It is designated No. 1 in Table II.

Example 2

Nitrogen was first conducted into a 2-litre flask of the same type as the one used in Example 1. Thereafter, 470 g. water, 12.5 g. of the emulsifier used in Example 1, a mixture of 225 g. butyl methacrylate and 25 g. xylene, 0.30 g. ammonium persulfate and 0.30 g. sulphur dioxide (each of the last two dissolved in 15 g. water), were added, in the order mentioned. The temperature was thereafter raised to 35° C., when the polymerization started. By means of cooling the temperature was held at 42–45° C. for 30 minutes, when the reaction ceased. The reaction mixture was thereafter cooled down to 35° C., after which all the components mentioned above, except water, were again added. The reaction temperature was again held at 42–45° C., and after the reaction was completed the batch was allowed to run for another 30 minutes, after which it was blown with air at 40° C. (to remove $SO_2$) for 15 minutes with the aid of nitrogen. The emulsion contained 41.1% dry substance. The yield, based on the weight of the monomers, was 97%.

The emulsion was treated as the emulsion from Example 1. The films are designated as 2 and 2A, respectively, in Table II.

Example 3

Carbon dioxide was first conducted into a 1-litre flask of the same type as the one used in Example 1. A mixture of 150 g. methyl methacrylate, 100 g. butyl acrylate and 0.63 g. 2-hydroxy-4-methoxy benzophenone (trade name Cyasorb UV 9, UV-absorber), had been weighed up in advance in a separate mixing vessel.

Thereafter 300 g. distilled water, 6.25 g. octyl phenoxy polyglycol ether with 12–13 ether ($CH_2 \cdot CH_2O$) groups (trade name Triton X–102), 125.3 g. monomer mixture, 0.15 g. ammonium persulfate and 0.15 g. sulphur dioxide, each of the last two dissolved in 8 g. water, were added in the order mentioned. The polymerization was thereafter carried out at 47–50° C. for 30 minutes. After cooling to 35° C. all of the above-mentioned components except the water were added again, and the reaction started spontaneously and was completed at 47–50° C. in 30 minutes. After cooling to 35° C. the emulsion was blown through with air for 30 minutes. The dry (solids) content of the emulsion was 45.0%. The yield was 98%, based on the weight monomers polymerized.

The emulsion was treated in the same way as the emulsion according to Example 1. The films are designated 3 and 3A, respectively, in Table II.

Example 4

Exactly the same procedure and raw materials as in Example 1 but with the difference that the monomer-emulsifier mixture consisted of 1855 g. butyl methacrylate, 145 g. butyl acrylate, 5.1 g. 2-hydroxy-4-methoxy benzophenone and 100 g. alkyl aryl polyglycol ether. The emulsion contained 48.3% of dry substance, i.e., solids. The yield was 98%, based on the weight of the monomers polymerized.

Films were made from the untreated emulsion (film 4), and from the emulsion to which had been added NH₃ to raise the pH thereof to 9.5 (film 4–1) a film 4–2 resulting from the addition of NaOH in place of NH₃ to raise the pH of the emulsion to 9.5 and from the emulsions titrated with Ba(OH)₂ (film 4A), Sr(OH)₂ (film 4B) and Ca(OH)₂ (film 4C). Also these latter three had been pH-adjusted to pH 9.5.

*Example 5*

235 g. de-ionized water, 6.25 g. polyethylene glycol ester (HLB value=15), 125 g. butyl methacrylate, 3 ml. 0.3 N barium hydroxide solution, 3 ml. 0.3 N ammonium persulfate solution, 0.137 g. sulphur dioxide dissolved in 10 g. water were added in the order mentioned into a 1-litre flask filled with nitrogen. After heating to 36° C. the polymerization started, after which the reaction temperature, through careful cooling, was held at 44–48° C. for 45 minutes. After cooling to 35° C. all of the components mentioned above, except the water, were added again, after which the reaction started spontaneously and was completed at 44–48° C. during 45 minutes. In order to remove a surplus of sulphur dioxide (the sulphur dioxide not precipitated by the Ba-ions) nitrogen was blown through the emulsion at 34° C. during 30 minutes. The dry content of the emulsion was 47.8%. The yield was 96%, based on the starting monomer.

The emulsion was treated as in Example 1. The films produced therefrom are designated 5 and 5A, respectively, in Table II.

*Example 6*

470 g. distilled water, 12.5 g. alkyl aryl polygylcol ether (HLB value=13), 237.5 g. butyl methacrylate, 0.30 g. ammonium persulfate dissolved in 6 g. water and 0.53 g. methyl amino bisulfite (methylammonium bisulfite) in the form of a 5.3 g. 10% solution were added in the order mentioned to a 2-litre flask filled with nitrogen. The reaction mixture was heated to 30° C., after which the temperature was further increased by the heat of the reaction. The temperature was thereafter held at 40–42° C., by cooling, for 50 minutes. Thereafter all of the above-mentioned components, except the water, were added again. The reaction then started spontaneously and the temperature was held at 40–42° C. for 30 minutes. Nitrogen was then blown through the emulsion at 35° C. during 30 minutes. The emulsion contained 48.6% dry substance.

The emulsion was treated in the same way as according to Example 1. The films produced therefrom are designated 6 and 6A, respectively, in Table II.

TABLE II

| Film No. | pH of Emulsion of Which Film was Made | Cation of Precipitation of Sulfate and Sulfite Ions | Translucency of Film, percent | | |
|---|---|---|---|---|---|
| | | | Before Emulsion in Water | After 24 hrs. in Water | After 72 hrs. In Water |
| 1 | 9.5 | | 100 | 41 | 15 |
| 1A | 9.5 | Ba++ | 100 | 93 | 88 |
| 2 | 9.5 | | 100 | 20 | 0 |
| 2A | 9.5 | Ba++ | 100 | 100 | 99 |
| 3 | 9.5 | | 99 | 29 | 12 |
| 3A | 9.5 | Ba++ | 99 | 94 | 87 |
| 4–1 | 9.5 | | 98 | 33 | 8 |
| 4–2* | 9.5 | | 98 | 24 | 0 |
| 4 | 1.9 | | 98 | 20 | 4 |
| 4A | 9.5 | Ba++ | 99 | 93 | 83 |
| 4B | 9.5 | Sr++ | 99 | 86 | 80 |
| 4C | 9.5 | Ca++ | 98 | 74 | 61 |
| 5 | 9.5 | | 98 | 30 | 18 |
| 5A | 9.5 | Ba++ | 98 | 90 | 86 |
| 6 | 9.5 | | 99 | 31 | 31 |
| 6A | 9.5 | Ba++ | 99 | 89 | 60 |

*pH adjusted to 9.5 with NaOH instead of NH₃.

It will be understood that the foregoing description of the invention and the examples set forth are merely illustrative of the principles thereof. Accordingly, the appended claims are to be construed as defining the invention within the spirit and scope thereof.

We claim:

1. The method which comprises: forming an aqueous emulsion of water and monomeric material selected from the group consisting of acrylic acid esters and methacrylic acid esters and mixtures of said esters and a non-ionic emulsifier, incorporating ammonium persulfate in the emulsion, allowing the emulsified monomeric material to polymerize, and adding thereto at least one precipitating ion selected from the group consisting of barium, strontium and calcium ions in an amount equivalent to the anions present in the emulsion system.

2. Method in accordance with claim 1, wherein the monomeric material is a combination of butyl methacrylate and butyl acrylate.

3. Method in accordance with claim 1, wherein the monomeric material is butyl methacrylate.

4. Method in accordance with claim 1, wherein the monomeric material is a combination of methyl methacrylate and butyl acrylate.

5. Method in accordance with claim 1, wherein the monomeric material is a combination of butyl methacrylate and butyl acrylate and the emulsifier in an alkyl aryl polyglycol ether having an HLB of about 13.

6. Method in accordance with claim 1, wherein the monomeric material is butyl methacrylate and the emulsifier is an alkyl aryl polyglylcol ether having an HLB of about 13.

7. Method in accordance with claim 1, wherein the monomeric material is a combination of methyl methacrylate and butyl acrylate and the emulsifier is octyl phenoxy polygylcol ether having an HLB of about 13.

8. Method in accordance with claim 5, wherein the precipitating ion is the barium ion.

9. Method in accordance with claim 6, wherein the precipitating ion is the barium ion.

10. Method in accordance with claim 7, wherein the precipitating ion is the barium ion.

11. The method which comprises: adding ammonium persulfate to an aqueous emulsion of butylacrylate micelles and a non-ionic emulsifier, allowing the butyl acrylate micelles to polymerize; and adding to the emulsion comprising the polymerized micelles a hydroxide selected from the group consisting of barium, strontium and calcium in an amount equivalent to the anions present in the emulsion system.

12. The method which comprises: adding ammonium persulfate to an aqueous emulsion of butylacrylate micelles and a non-ionic emulsifier; allowing the butyl acrylate micelles to polymerize; and adding barium hydroxide to the emulsion comprising the polymerized micelles in an amount equivalent to the anions present in the emulsion system.

13. The method which comprises: adding ammonium persulfate to an aqueous emulsion of butylmethacrylate micelles and a non-ionic emulsifier, allowing the butyl methacrylate micelles to polymerize; and adding to the emulsion comprising the polymerized micelles a hydroxide selected from the group consisting of barium, strontium and calcium in an amount equivalent to the anions present in the emulsion system.

14. The method which comprises: adding ammonium persulfate to an aqueous emulsion of butylmethacrylate micelles and a non-ionic emulsifier; allowing the butyl methacrylate micelles to polymerize; and adding barium hydroxide to the emulsion comprising the polymerized micelles in an amount equivalent to the anions present in the emulsion system.

15. The method which comprises: adding ammonium persulfate to an aqueous emulsion of micelles of methylmethacrylate and butylacrylate and a non-ionic emulsifier; allowing the methylmethacrylate and butyl acrylate micelles to copolymerize; and adding to the emulsion comprising the copolymerized micelles a hydroxide selected from the group consisting of barium, strontium and calcium in an amount equivalent to the anions present in the emulsion system.

16. The method which comprises: adding ammonium persulfate to an aqueous emulsion of micelles of methylmethacrylate and butylacrylate and a non-ionic emulsifier; allowing the methylmethacrylate and butyl acrylate micelles to copolymerize; and adding barium hydroxide to the emulsion comprising the copolymerized micelles in an amount equivalent to the anions present in the emulsion system.

17. The method which comprises: adding ammonium persulfate to an aqueous emulsion of micelles of butylacrylate and butylmethacrylate and a non-ionic emulsifier; allowing the butylacrylate and butyl methacrylate micelles to copolymerize; and adding to the emulsion comprising the copolymerized micelles a hydroxide selected from the group consisting of barium, strontium and calcium in an amount equivalent to the anions present in the emulsion system.

18. The method which comprises: adding ammonium persulfate to an aqueous emulsion of micelles of butyl acrylate and butylmethacrylate and a non-ionic emulsifier; allowing the butylacrylate and butyl methacrylate micelles to copolymerize; and adding barium hydroxide to the emulsion comprising the copolymerized micelles in an amount equivalent to the anions present in the emulsion system.

References Cited by the Examiner

UNITED STATES PATENTS 2,754,280    7/1956    Brown et al. _____ 260—86.1
2,843,576    7/1958    Dunn et al. _____ 260—89.5

FOREIGN PATENTS 573,270    11/1945    Great Britain.

OTHER REFERENCES

Howe et al., Chem. Abs., vol. 49 (1955), p. 13734g.
Ito et al., Chem. Abs., vol. 53 (1959), p. 10837b.
Schildknecht (Polymer Processes), published by Interscience Publ., Inc., New York, 1956, pp. 122, 123, 137, 142, 143 and 153.

JOSEPH L. SCHOFER, Primary Examiner.

H. N. BURSTEIN, JOSEPH R. LIBERMAN, LEON J. BERCOVITZ, Examiners.